United States Patent [19]

Bruening et al.

[11] Patent Number: 5,173,470

[45] Date of Patent: * Dec. 22, 1992

[54] COMPOSITIONS AND PROCESSES FOR REMOVING, SEPARATING AND CONCENTRATING DESIRED IONS FROM SOLUTIONS USING SULFUR AND ARALKYL NITROGEN CONTAINING LIGANDS BONDED TO INORGANIC SUPPORTS

[75] Inventors: Ronald L. Bruening, Orem; Bryon J. Tarbet, Highland; Reed M. Izatt; Jerald S. Bradshaw, all of Provo, Utah

[73] Assignee: Brigham Young University, Provo, Utah

[*] Notice: The portion of the term of this patent subsequent to Aug. 13, 2008 has been disclaimed.

[21] Appl. No.: 743,240

[22] Filed: Aug. 9, 1991

[51] Int. Cl.$^5$ .............................................. B01J 20/22
[52] U.S. Cl. .................................. 502/401; 210/670
[58] Field of Search ............................................ 502/401

[56] References Cited

U.S. PATENT DOCUMENTS

| | | | |
|---|---|---|---|
| 4,133,755 | 1/1979 | Tarao et al. | 502/401 X |
| 4,650,784 | 3/1987 | Ramsden et al. | 502/401 X |
| 4,767,670 | 8/1988 | Cox et al. | 502/401 X |
| 4,876,232 | 10/1989 | Barratt | 502/401 X |
| 5,039,419 | 8/1991 | Bradshaw et al. | 502/401 R |
| 5,071,819 | 12/1991 | Tarbet et al. | 502/401 |

Primary Examiner—Patrick P. Garvin
Attorney, Agent, or Firm—Thorpe, North & Western

[57] ABSTRACT

A method for the removal and concentration of desired ions such as Pd(II), Pt(IV), Pt(II), Pd(IV), Ru(III), Ru(II), Au(III), Os(IV), Au(I), Cu(I), Cu(II), Ag(I), and Hg(II) from a multiple ion source solution which may contain larger concentrations of other undesired ions including H$^+$ comprises bringing the source solution into contact with a compound comprising a thiol and/or thioether aralkyl nitrogen-containing ligand covalently bonded through an organic spacer silicon grouping to a solid inorganic support. The thiol and/or thioether aralkyl nitrogen-containing ligand portion(s) of the compound has an affinity for the desired ions to form a complex thereby removing the desired ions from the source solution. The desired ions are removed from the compound by contacting the compound with a much smaller volume of a receiving solution having a greater affinity for the desired ions than does the thiol and/or thioether aralkyl nitrogen-containing ligand portion of the compound. The process is useful in removing desired or unwanted ions from Rh and Ir concentrates, acidic waste streams, multiple platinum group metal refining streams, and other industrial or environmental streams. The invention is also drawn to the thiol and/or thioether aralkyl nitrogen-containing ligands covalently bonded through a spacer grouping to a hydrophilic inorganic solid support material. The preferred aralkyl group is benzyl.

14 Claims, No Drawings

COMPOSITIONS AND PROCESSES FOR REMOVING, SEPARATING AND CONCENTRATING DESIRED IONS FROM SOLUTIONS USING SULFUR AND ARALKYL NITROGEN CONTAINING LIGANDS BONDED TO INORGANIC SUPPORTS

FIELD OF THE INVENTION

This invention relates to thiol and/or thioether-aralkyl nitrogen-containing hydrocarbons covalently bonded to inorganic solid supports and to processes for removing, separating and concentrating certain desired ions from solutions wherein such ions may be admixed with other ions which may be present in much higher concentrations by the use of such thiol and/or thioether-aralkyl nitrogen supported materials. More particularly, this invention relates to a process for removing such ions from an admixture with others in solution by forming a complex of the desired ions with compounds composed of a thiol and/or thioether-aralkyl nitrogen hydrocarbon bonded to an inorganic matrix by flowing such solutions through a column packed with such thiol and/or thioether-aralkyl nitrogen-solid supported materials and then selectively breaking the complex of the desired ion from the compounds to which such ion has become attached by flowing a receiving liquid in much smaller volume than the volume of solution passed through the column to remove and concentrate the desired ions in solution in the receiving liquid. The concentrated ions thus removed may then be recovered by known methods.

BACKGROUND OF THE INVENTION

Effective methods for the recovery and/or separation of particular ions such as platinum, ruthenium, palladium, copper, osmium, gold, silver, and mercury ions in either cation or complex anion form from solutions thereof, admixed with chelating agents and/or other ions which may be present, represent a real need in modern technology. As specific examples, efficient and economical separation of (1) small amounts of Pt, Pd, Au, Ag, Os, Cu, and/or Ru from Rh and/or Ir concentrates; (2) separation of Pt, Pd, Au, Ag, and/or Ru from solutions containing large amounts of base metals; and (3) separation of Cu and/or Hg as toxic wastes from acidic solutions, all represent real separation needs with presently either unsatisfactory technologies for their accomplishment, or for which more economical technologies are desired. These ions are often present at low concentrations in solutions containing other ions at much greater concentrations. Hence, there is a real need for a process to selectively concentrate and recover these ions.

It is known that molecules containing both the thioether and/or thiol sulfur atoms, as well as amine nitrogen atoms, show strong and somewhat selective interactions with Pt, Pd, Au, Ag, Os, Cu, Ru, and Hg ions under acidic conditions. These molecules also interact with a variety of base metal ions under nonacidic conditions. The synthesis and use of molecules containing both thioether and/or thiol sulfur atoms, as well as simple amine nitrogen atom(s), covalently bonded to inorganic solid supports has been previously described by Tarbet et. al. in copending patent application Ser. No. 7/236,763, filed Aug. 26, 1988 and now U.S. Pat. No. 5,071,819 titled *"Sulfur and Nitrogen Containing Hydrocarbons and Process of Using Same in Separating Desired Ions From Solutions Thereof,"* and in a pending continuation-in-part application Ser. No. 7/542,013, filed Jun. 22, 1990 and now U.S. Pat. No. 5,084,430 and also in a pending divisional application Ser. No. 7/545,209, filed Jun. 28, 1990. Only simple amine nitrogen atoms are disclosed in the pending Tarbet et al. patent applications. The synthesis and use of simple monothioether-aniline moieties covalently bonded to silica gel have been reported by T. Seshadri et al. in *"Silica-Immobilized2-[(2-(triethoxysilyl)-ethyl)thio]aniline as a Selective Sorbent for the Separation and Preconcentration of Palladium,"* Anal. Chem, 60, 47-52 (1988). These molecules described by Seshadri et. al. have reduced capacities for all of the desired ions of current interest, except palladium. The kinetics of interaction with several of the ions are quite slow, and the loss of interactive strength with increasing acidity above 0.1M acid is also extensive for the ions of interest except palladium. The effectiveness of these materials with palladium in HCl matrices >5M has not been studied and a small potential for degradation with increasing acidity was also noted. Finally, neither Os nor Ru could be eluted in any degree from these materials. The lower stability of these aniline based bound ligands is due in part to both the use of the weaker binding aniline nitrogen and aromatic thiol sulfur donor atoms.

The products and processes described in the present invention overcome virtually all of the difficulties of the related materials described above.

SUMMARY OF THE INVENTION

The unique properties of the thiol and/or thioether aralkyl nitrogen-containing hydrocarbon ligands as attached to appropriate inorganic solid supports form the basis of the present invention. The compounds, methods of synthesis and properties are described below. The invention also encompasses processes for using the compounds for the separation of desired ions.

The compounds of the present invention comprise suitable thiol and/or thioether-aralkyl-nitrogen containing hydrocarbon ligands which are covalently bonded through a spacer grouping to a silicon atom and further covalently bonded to a solid support and are represented by the following formula:

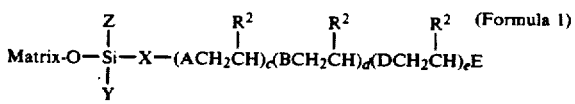

In Formula 1, A and B are members independently selected from the group consisting of NR, N(R)CH$_2$, S and SCH$_2$; D is a member selected from the group S and SCH$_2$; E is a member selected from the group consisting of SH and H; R is an aralkyl group wherein the aryl portion is a member selected from the group consisting of phenyl, naphthyl and pyridyl and substituted derivatives thereof and the alkyl portion of the group contains one to three carbon atoms with one being preferable; R$^2$ is a member independently selected from the group consisting of H, SH, OH, lower alkyl, and aryl, where aryl has the same meaning as given above; c is an integer from 1 to about 10; d and e are each integers from 0 to about 10; with the following provisos: (1) when A is S or SCH$_2$, d is an integer of 1 to 10 and at least one B is NR or N(R)CH$_2$; (2) when A is NR or N(R)CH$_2$, e is 0 with the following subprovisos: (a) when d is 0, E is SH;

(b) when E is H, d is an integer of 1-10 and at least one B is S or $SCH_2$. X is a spacer grouping either (1) having the formula:

$$(CH_2)_d(OCH_2CHR^1CH_2)_b$$

wherein $R^1$ is a member selected from the group consisting of H, SH, OH, lower alkyl, and aryl, such as phenyl, naphthyl and pyridyl; a is an integer from 3 to about 10; b is an integer of 0 or 1; or (2) is an aralkyl group wherein the aryl portion is as defined above for aryl and the alkyl contains from 1 to 6 carbon atoms. Y and Z are members independently selected from the group consisting of Cl, Br, I, alkyl, alkoxy, substituted alkyl or substituted alkoxy and O-matrix and matrix is selected from the group consisting of sand, silica gel, glass, glass fibers, alumina, zirconia, titania and nickel oxide or other hydrophilic inorganic supports and mixtures thereof. When Y and Z moieties are other than O-matrix they are functionally classified as leaving groups, i.e. groups attached to the silicon atom which, when reacted with an O-solid hydrophilic matrix material, may leave or be replaced by the O-matrix. If any such functional leaving groups are left over after reacting a silicon containing spacer group or spacer/ligand group with the solid hydrophilic matrix support material, these groups will have no direct function in the interaction between the desired ion and the thiol and/or thioether-aralkyl-nitrogen containing hydrocarbon ligand attached to the solid support. Unless otherwise stated, alkyl or alkoxy means 1 to 6 carbon member groups which may be substituted or unsubstituted, straight or branched chain. Aryl and aralkyl groups may also be substituted. By substituted is meant by groups such as Cl, Br, I, $NO_2$ and the like which do not interfere with the functioning and/or operation of the compounds for the removal and separation of the desired ions.

As can be seen from the above formula and provisos, there must always be at least one NR or $N(R)CH_2$ group present and at least one S, $SCH_2$ or SH group present. Since R is an aralkyl group, the terminology a thiol(SH) and/or thioether(S or $SCH_2$)-aralkyl-nitrogen(NR or $N(R)CH_2$) containing hydrocarbon ligand attached, through a spacer grouping (X) to a solid support is appropriate.

X is a spacer grouping which is of a functional nature that it is sufficiently hydrophilic to function in an aqueous environment and will separate the ligand from the solid matrix support surface to maximize the interaction between the ligand and desired ion being separated. Representative of X are members such as glycidoxyalkyl, alkoxyalkyl, p-(chloromethyl)phenyl and the like.

Those compounds where X is of the formula $(CH_2)_d(OCH_2CHR^1CH_2)_b$ are preferred. The glycidoxyalkyl grouping and particularly the 3-glycidoxypropyl group are most preferred. Also preferred are those compounds wherein R is benzyl. The prefered E group is SH. The preferred $R_2$ grouping is H.

Within the above framework, suitable subgroupings include those where d is an integer of 1 to 10, A is a member selected from the group consisting of NR or $N(R)CH_2$ and B is a member selected from the group consisting of S and $SCH_2$. This provides a ligand having at least one benzylamine and at least one thioether and thiol grouping. A different subgrouping is where d is an integer of 1 to 10, A is a member selected from the group consisting of S or $SCH_2$ and at least one B is a member selected from the group consisting of NR or $N(R)CH_2$. This provides a ligand having a terminal thiol and at least one thioether group separated by at least one benzylamine. Another subgrouping is where d and e are each integers of 1 to 10, A and D are each members selected from the group consisting of S or $SCH_2$ and at least one B is a member selected from the group consisting of NR or $N(R)CH_2$. This provides a ligand having thioethers on either side of the benzylamine group and the ligand also terminates in a thiol group. A still different subgrouping is where d and e are each 0 and A is a member selected from the group consisting of NR or $N(R)CH_2$. This results in a benzylamine ligand terminating in a thiol group.

Exemplary of compounds within the above subgroupings are those wherein (1) A is NR, c is 1, B is S, d is 3, e is 0 and E is SH, i.e. a compound containing four S atoms and one aralkylamine group; (2) A is S, c is 2, B is NR, d is 1, D is S, e is 1, and E is SH, i.e. a compound containing four S atoms and one aralkylamine group; and (3) A is NR, c is 1, d and e are 0 and E is SH, i.e. a compound containing one S atom and one aralkylamine group. In the above, NR is preferably benzylamine.

The use of the aralkyl, and particularly the benzyl, substituted nitrogen, instead of the simple amine or aniline nitrogens referred to in the background section above, enhances selectivity while the presence of alkyl thioether and/or thiol sulfur atoms, including chains containing multiple sulfur atoms, overcomes the kinetic and interactive strength as well as the stability problems encountered previously.

The presence of benzyl or other aralkyl containing nitrogens, rather than simple amino nitrogens, reduces the interaction of several base metals as well as Rh and Ir with the materials and, hence, increases the selectivity of the sulfur plus nitrogen molecules for ions such as Palladium, Platinum, and Ruthenium. This enhanced selectivity is particularly important relative to selectivity over metals present as complex anions such as the chloro complexes of Rh(III), Ir(III) and Bi(III) in HCl matrices. These complex anions have greater affinity for the more basic and sterically unhindered amines when they are protonated and, hence, positively charged.

The thiol and/or thioether aralkyl nitrogen ligands covalently bonded to solid supports as shown in Formula 1 are characterized by high selectivity for and removal of desired ions or groups of desired ions such as $Pd^{4+}$, $Pd^{2+}$, $Pt^{4+}$, $Pt^{2+}$, $Ru^{3+}$, $Ru^{2+}$, $Os^{4+}$, $Cu^+$, $Cu^{2+}$, $Au^{3+}$, $Au^+$, $Ag^+$, and $Hg^{2+}$ present at low concentrations from the source phase solution containing a mixture of these metal ions with the ions one does not desire to remove (i.e. referred to as "undesired ions") present in much greater concentrations in the solution. The separation is accomplished, even in the presence of other complexing agents or matrix constituents, particularly acids, in a separation device, such as a column, through which the solution is flowed. The process of selectively removing and concentrating the desired ion(s) is characterized by the ability to quantitatively complex from a larger volume of solution the desired ion(s) when they are present at low concentrations. The desired ions are recovered from the separation column by flowing through it a small volume of a receiving phase which contains a solubilizing reagent which need not be selective, but which will strip the desired ions from the ligand quantitatively. The recovery of the desired metal ions from the receiving phase is readily accomplished by known procedures.

DETAILED DESCRIPTION OF THE PREFERRED EMBODIMENTS

As summarized above, the present invention is drawn to novel thiol and/or thioether aralkyl nitrogen-containing hydrocarbon ligands covalently bound through a spacer to a silicon moiety and further attached to a solid matrix or support, to form the compounds of Formula 1. The invention is also drawn to the concentration and removal of certain desired ions such as $Pd^{2+}$, $Pd^{4+}$, $Pt^{4+}$, $Pt^{2+}$, $Ru^{2+}$, $Ru^{3+}$, $Os^{4+}$, $Au^{3+}$, $Au^{+}$, $Ag^{+}$, $Cu^{2+}$, $Cu^{+}$, and $Hg^{2+}$ from other ions. For example, effective methods of recovery and/or separation of metal ions from other metal ions, such as (1) the small amounts of Pt, Pd, Au, Ag, Os, Cu, and/or Ru from Rh and/or Ir concentrates; (2) separation of Pd, Pt, Au, Ag, and/or Ru from solutions containing large amounts of base metals; and (3) separation of Cu and/or Hg as toxic wastes from acidic solutions represent a real need for which there are no feasible and established procedures or for which more economical processes are desired. Such solutions from which such ions are to be concentrated and/or recovered are referred to herein as "source solutions." In many instances the concentration of desired ions in the source solutions will be much less than the concentration of other or undesired ions from which they are to be separated.

The concentration of desired ions is accomplished by forming a complex of the desired ions with a compound shown in Formula 1 by flowing a source solution containing the desired ions through a column packed with a Formula 1 compound to attract and bind the desired ions to the ligand portion of such compound and subsequently breaking the ligand compound-complex by flowing a receiving liquid in much smaller volume than the volume of source solution passed through the column to remove and concentrate the desired ions in the receiving liquid solution. The receiving liquid or recovery solution forms a stronger complex with the desired ions than does the ligand portion of a Formula 1 compound and thus the desired ions are quantitatively stripped from the ligand in concentrated form in the receiving solution. The recovery of desired ions from the receiving liquid is accomplished by known methods.

The thiol and/or thioether aralkyl nitrogen-containing ligand compounds, as represented by Formula 1, may be prepared by various methods which are illustrated in the examples which follow.

EXAMPLE 1

In this example 2 grams of benzylamine was first reacted with 4.4 grams of 3-glycidoxypropyltrimethoxysilane at room temperature. After allowing the mixture to react overnight, 1 equivalent of ethylene sulfide was added and again reacted at room temperature overnight. After reaction, the mixture was warmed to 40°–70° C. and 34 grams of silica gel (35–60 mesh) were added. The mixture was stirred and heated for an additional 8 hrs, filtered and dried under vacuum. A compound was prepared corresponding to Formula 1 wherein the ligand is made up such that c is 1, and A is NR with R being benzyl, $R^2$ is H and d and e are 0, and E is SH. The spacer X is $(CH_2)_d(OCH_2CHR^1CH_2)_b$ with a being 3, b being 1 and $R^1$ being OH. Y and Z are either O-matrix or methoxy. This compound has the formula:

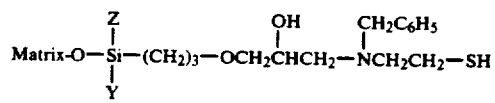

wherein Y and Z are either O-matrix or methoxy.

EXAMPLE 2

Again following the procedure of Example 1, 2 grams of benzylamine was first reacted with 4.4 grams of 3-glycidoxypropyltrimethoxysilane at room temperature. After allowing the mixture to react overnight, 4 equivalents of ethylene sulfide were added and again reacted at room temperature overnight. After reaction, the mixture was warmed to 40°–70° C. and 34 grams of silica gel (35–60 mesh) were added. The mixture was stirred and heated for an additional 8 hrs, filtered and dried under vacuum. A compound was prepared corresponding to Formula 1 wherein the ligand is made up such that c is 1, and A is NR with R being benzyl, d is 3, B is S (all occurrences), $R^2$ is H (all occurrences), e is 0, and E is SH. The spacer X is $(CH_2)_d(OCH_2CHR^1CH_2)_b$ with a being 3, b being 1 and $R^1$ being OH. Y and Z are either O-matrix or methoxy. This compound has the formula:

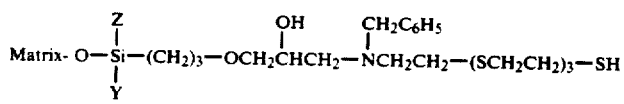

wherein Y and Z are either O-matrix or methoxy.

EXAMPLE 3

In this example 2 grams of benzylamine was first reacted with 4 equivalents of ethylene sulfide at room temperature. After allowing the mixture to react overnight, a small amount of sodium methoxide (1 mL of a 0.3 mole/L solution) was added, followed by 3-glycidoxypropyltrimethoxysilane and the reaction mixture was warmed to 40°–70° C. Silica gel (35–60 mesh, 34 grams) was added after the mixture had reacted for 4–6 hrs. The mixture was stirred and heated for an additional 18 hrs, filtered and dried under vacuum. A compound was prepared corresponding to Formula 1 wherein the ligand is made up such that c is 2, and A is S (both occurrences), d is 1, B is NR with R being benzyl, e is 1, D is S, $R^2$ is H (all occurrences), and E is SH. The spacer X is $(CH_2)_d(OCH_2CHR^1CH_2)_b$ with a being 3, b being 1 and $R^1$ being OH. Y and Z are either O-matrix or methoxy. This compound has the formula:

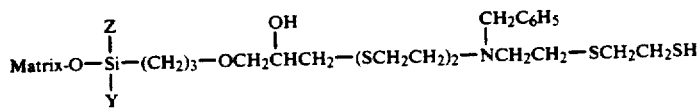

wherein Y and Z are either O-matrix or methoxy.

The process of selectively and quantitatively concentrating and removing a desired ion or group of desired ions present at low concentrations from a plurality of other undesired ions in a multiple ion source solution in which the undesired ions, along with acid(s) and other chelating agents may be present at much higher concentrations, comprises bringing the multiple ion containing source solution into contact with a thiol and/or thioether aralkyl nitrogen ligand-containing solid supported compound as shown in Formula 1 which causes the desired ion(s) to complex with the thiol and/or thioether aralkyl nitrogen-containing ligand portion of the compound and subsequently breaking or stripping the desired ion from the complex with a receiving solution which forms a stronger complex with the desired ions than does the thiol and/or thioether aralkyl nitrogen-containing ligand or which forms a stronger complex with the thiol and/or thioether aralkyl nitrogen-containing ligand. The receiving or recovery solution contains only the desired ions in a concentrated form.

The thiol and/or thioether aralkyl nitrogen-containing ligand solid matrix support functions to attract the desired ions (DI) according to Formula 2:

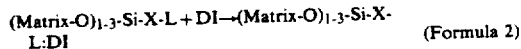
(Formula 2)

Except for DI, Formula 2 is an abbreviated form of Formula 1 wherein L stands for the thiol and/or thioether aralkyl nitrogen-containing ligand. DI stands for desired ion being removed. When Matrix-O is less than three the other positions are taken by Y and Z groups as described above.

Once the desired ions are bound to the thiol and/or thioether aralkyl nitrogen-containing ligand, they are subsequently separated by use of a smaller volume of a receiving liquid according to Formula 3:

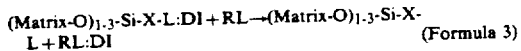
(Formula 3)

where RL stands for the receiving liquid.

The preferred embodiment disclosed herein involves carrying out the process by bringing a large volume of the source multiple ion solution, which may contain hydrogen ions and may also contain chelating agents, into contact with a thiol and/or thioether aralkyl nitrogen-containing ligand-solid support compound of Formula 1 in a separation column through which the mixture is first flowed to complex the desired metal ions (DI) with the thiol and/or thioether aralkyl nitrogen-containing ligand-solid support compound as indicated by Formula 2 above, followed by the flow through the column of a smaller volume of a receiving liquid (RL), such as aqueous solutions of thiourea, NH$_4$OH, Na$_2$S$_2$O$_3$, HI, HBr, NaI, ethylenediamine, Na$_4$EDTA, glycine, thiourea plus a reductive catalyst such as hypophosphorous acid, and others which form a stronger complex with the desired ion than does the thiol and/or thioether aralkyl nitrogen-containing ligand bound to the solid support or forms a stronger complex with the thiol and/or thioether aralkyl nitrogen-containing ligand bound to solid support than does the desired ion. In this manner the desired ions are carried out of the column in a concentrated form in the receiving solution as indicated by Formula 3. The degree or amount of concentration will obviously depend upon the concentration of desired ions in the source solution and the volume of source solution to be treated. The specific receiving liquid being utilized will also be a factor. The receiving liquid does not have to be specific to the removal of the desired ions because no other ions will be complexed to the ligand. Generally speaking the concentration of desired ions in the receiving liquid will be from 20 to 1,000,000 times greater than in the source solution. Other equivalent apparatus may be used instead of a column, e.g., a slurry which is filtered which is then washed with a receiving liquid to break the complex and recover the desired ion(s). The concentrated desired ions are then recovered from the receiving phase by known procedures.

Illustrative of desired ions which have strong affinities for thiol and/or thioether aralkyl nitrogen-containing ligands bound to solid supports are Pd(II), Pt(IV), Pt(II), Pd(IV), Ru(III), Ru(II), Au(III), Os(IV), Au(I), Cu(I), Cu(II), Ag(I), and Hg(II). This listing of preferred ions is not comprehensive and is intended only to show the types of preferred ions which may be bound to thiol and/or thioether aralkyl nitrogen-containing ligands attached to solid supports in the manner described above. The affinity of the ligand to the ions will obviously vary depending upon the ion and the ligand configuration. Hence it is possible that, even in the above listing, those ions having the stronger affinity for the ligand will be selectively removed from other ions in the listing which have a weaker affinity for the particular ligand. Hence, by proper choice of ligands and makeup of the source solution it is also possible to separate and concentrate one desired ion from another. Therefore, the terminology "desired ions" and "undesired ions" is relative and the ion having the stronger affinity to the ligand will generally be the "desired" ion.

The process of the invention is particularly adaptable to the removal of Pd(II), Pt(IV), Ag(I), Au(III), and/or Ru(III) ions from source solutions which may additionally contain Rh(III), Ir(III), Cl$^-$, and/or Br$^-$ ions. In these instances, the receiving liquid for removing the ion(s) bound to the ligand will preferably be 0.5–1.0M Thiourea plus 0.1M hypophosphorous acid.

Removal of Desired Molecules With Ligand-Matrix Compounds

The following examples demonstrate how the thiol and/or thioether aralkyl nitrogen-containing ligand bound to a solid support compound of Formula 1 may be used to concentrate and remove desired ions. The thiol and/or thioether aralkyl nitrogen-containing ligand containing solid support compound is placed in a column. An aqueous source solution containing the desired ion or ions, in a mixture of other undesired ions and/or chelating agents which may be in a much greater concentration, is passed through the column. The flow rate for the solution may be increased by applying pressure with a pump on the top or bottom of the column or applying a vacuum in the receiving vessel. After the source solution has passed through the column, a much smaller volume of a recovery solution, i.e. an aqueous solution, which has a stronger affinity for the desired ions than does the ligand, is passed through the column. This receiving solution contains only the desired ion(s) in a concentrated form for subsequent recovery. Suitable receiving solutions can be selected from the group consisting of HBr, thiourea, NaI, HI, NH$_4$OH, ethylenediamine, Na$_4$EDTA, Na$_2$S$_2$O$_3$, glycine and mixtures thereof as well as others such as thiourea plus a reductive catalyst such as hypophosphorous acid. The preceding listing is exemplary and other receiving solutions may also be utilized, the only limitation being their ability to function to remove the desired ions from the thioether aralkyl nitrogen-containing ligand.

The following examples of separations and recoveries of ions by the inorganic support-bound thiol and/or thioether aralkyl nitrogen-containing ligands which were made as described in Examples 1 through 3 are given as illustrations. These examples are illustrative only, and are not comprehensive of the many separations of ions that are possible using the materials of Formula 1. However, separation of other desired ions may be accomplished as in the following examples and the exact process or procedure to be followed can be readily determined by one skilled in the art.

EXAMPLE 4

In this example, 5 g of the thiol and benzylamine ligand containing compound shown in Example 1 was placed in a column. A 100 ml source solution of 150 ppm (parts per million) Pt(IV) and 1000 ppm Rh(III) in 1M HCl was drawn through the column. A 10 ml aqueous solution of 0.1M HCl was then passed through the column as a receiving liquid for Rh(III). Analysis of the above solutions by Inductively Coupled Plasma Spectroscopy (ICP) showed that greater than 98% of the Rh(III) ions originally in the 100 ml solution described above was in the 120 ml combined recovery solution and that Pt could not be detected (<1 ppm) in the recovery solution. A 25 ml aqueous solution of 80° C. 0.5M thiourea, 0.1M hypophosphorous acid was then passed through the column as a Pt(IV) receiving liquid. Analysis of this solution by ICP showed that greater than 95% or the Pt(IV) ions originally in the 100 ml solution described above was in the 25 ml thiourea solution. Furthermore, 5 ppm Rh was detected in the thiourea solution and the column appeared white as it did originally. This example demonstrates the separation of two ions, both of which are generally designated herein as "desired ions" from each other.

EXAMPLE 5

In this example, 5 g of the polythioether, thiol and benzylamine ligand containing compound shown in Example 2 was placed in a column. The experiment of Example 4 was repeated, with virtually identical results in effecting the separation of Rh(III) and Pt(IV) ions from each other.

EXAMPLE 6

In this example, 5 g of the polythioether, thiol and benzylamine ligand containing compound shown in Example 3 was placed in a column. A 100 ml solution of 150 ppm Pt(IV) and 1000 ppm Rh(III) in 1M NaCl and 0.1M HCl was drawn through the column. The rest of the procedure of Example 4 was followed with virtually identical results again being obtained.

EXAMPLE 7

In this example, 5 g of the polythioether, thiol and benzylamine ligand containing compound shown in Example 2 was placed in a column. A 50 ml source solution of 100 ppm Ru(III) and 1000 ppm Rh(III) in 0.1M HCl was drawn through the column. A 5 ml aqueous solution of 0.1M HCl was then passed through the column. The Rh was quantitatively (within analytical error) recovered in the above solutions after passing through the column, while the Ru level was reduced to less than 5 ppm. The Ru was then eluted using 70° C. 1M thiorea and 0.1M HCl as a receiving liquid.

From these examples it will be appreciated that the thiol and/or thioether aralkyl nitrogen-containing ligands of Formula 1 bonded to a solid support, such as silica gel, provide materials useful for the separation and concentration of ions such as Pd, Pt, Au, Ag, Ru, Os, Cu, and Hg from mixtures of these ions with other metal ions. This recovery may be accomplished even in the presence of acids and/or complexing agents. The ions of interest can then be recovered from the concentrated recovery solution by standard techniques known in the science of these materials.

Although the invention has been described and illustrated by reference to certain specific silica gel-bound thiol and/or thioether aralkyl nitrogen-containing ligands falling within the scope of Formula 1 and the process of using them, other analogs of these thiol and/or thioether aralkyl nitrogen-containing ligand compounds also falling within the scope of Formula 1 are also within the scope of the invention as are processes of using them to separated and recover desired ions. The invention is therefore limited only in scope by the following claims and functional equivalents thereof.

We claim:

1. A thiol and/or thioether aralkyl nitrogen-containing ligand-solid support compound of the formula:

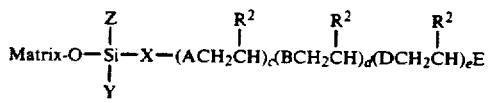

wherein
- (i) A and B are members independently selected from the group consisting of NR, N(R)CH$_2$, S and SCH$_2$;
- (ii) D is a member selected from the group S and SCH$_2$;
- (iii) E is a member selected from the group consisting of SH and H;
- (iv) R is an aralkyl group wherein the aryl portion is a member selected from the group consisting of phenyl, naphthyl and pyridyl and substituted derivatives thereof and the alkyl portion of the group contains 1 to 3 carbon atoms;
- (v) R$^2$ is a member independently selected from the group consisting of H, SH, OH, lower alkyl, and aryl, where aryl is a member selected from the group consisting of phenyl, naphthyl and pyridyl and substituted derivatives thereof;
- (vi) c is a integer from 1 to about 10;
- (vii) d and e are each integers from 0 to about 10;

with the following provisos that when A is S or SCH$_2$, d is an integer of 1 to 10 and at least one B is NR or N(R)CH$_2$ and when A is NR or N(R)CH$_2$, e is 0 with the subprovisos that when d is 0, E is SH and when E is H, d is an integer of 1 to 10 and at least one B is S or SCH$_2$;

(viii) X is a spacer grouping selected from the group consisting of:

(CH$_2$)$_d$(OCH$_2$CHR$^1$CH$_2$)$_b$ or aralkyl wherein:
- (a) R$^1$ is a member selected from the group consisting of H, SH, OH, lower alkyl, and aryl, where aryl is a member selected from the group consisting of phenyl, naphthyl and pyridyl and substituted derivatives thereof;
- (b) a is an integer from 3 to about 10;
- (c) b is an integer of 0 or 1;
- (d) aralkyl is a group wherein the aryl portion is a member selected from the group consisting of phenyl, naphthyl and pyridyl and substituted derivatives thereof and the alkyl portion contains from 1 to 6 carbon atoms;

(ix) Y and Z are members independently selected from the group consisting of Cl, Br, I, alkyl, alkoxy, substituted alkyl or substituted alkoxy and O-matrix; and (x) matrix is selected from the group consisting of sand, silica gel, glass, alumina, zirconia, titania and nickel oxide or other hydrophilic inorganic supports and mixtures thereof.

2. A compound according to claim 1 wherein X is a spacer grouping having the formula (CH$_2$)$_d$(OCH$_2$CHR$^1$CH$_2$)$_b$.

3. A compound according to claim 2 wherein R is benzyl.

4. A compound according to claim 3 wherein X is a glycidoxyalkyl group.

5. A compound according to claim 4 wherein X is 3-glycidoxypropyl.

6. A compound according to claim 5 wherein E is SH.

7. A compound according to claim 6 wherein R$^2$ is H.

8. A compound according to claim 7 wherein d is an integer of 1 to 10, e is 0, A is a member selected from the group consisting of NCH$_2$C$_6$H$_5$ or N(CH$_2$C$_6$H$_5$)CH$_2$, B is a member selected from the group consisting of S and SCH$_2$.

9. A method according to claim 8 wherein A is NCH$_2$C$_6$H$_5$, c is 1, B is S and d is 3.

10. A compound according to claim 7 wherein d is an integer of 1 to 10, e is 0, A is a member selected from the group consisting of S or SCH$_2$ and at least one B is a member selected from the group consisting of NCH$_2$C$_6$H$_5$ or N(CH$_2$C$_6$H$_5$)CH$_2$.

11. A compound according to claim 7 wherein d and e are each integers of 1 to 10, A and D are each members selected from the group consisting of S or SCH$_2$ and at least one B is a member selected from the group consisting of NCH$_2$C$_6$H$_5$ or N(CH$_2$C$_6$H$_5$)CH$_2$.

12. A compound according to claim 11 wherein A is S, c is 2, B is NCH$_2$C$_6$H$_5$, d is 1, D is S and e is 1.

13. A compound according to claim 7 wherein d and e are each 0 and A is a member selected from the group consisting of NCH$_2$C$_6$H$_5$ or N(CH$_2$C$_6$H$_5$)CH$_2$.

14. A compound according to claim 13 wherein A is NCH$_2$C$_6$H$_5$ and c is 1.

* * * * *